US012625005B2

(12) United States Patent
　　　 Fujino et al.

(10) Patent No.: US 12,625,005 B2
(45) Date of Patent: May 12, 2026

(54) RADIATION TEMPERATURE MEASUREMENT DEVICE AND RADIATION TEMPERATURE MEASUREMENT METHOD

(71) Applicant: HORIBA, Ltd., Kyoto (JP)

(72) Inventors: Sho Fujino, Kyoto (JP); Koji Tominaga, Kyoto (JP)

(73) Assignee: HORIBA, Ltd., Kyoto (JP)

( * ) Notice: Subject to any disclaimer, the term of this patent is extended or adjusted under 35 U.S.C. 154(b) by 324 days.

(21) Appl. No.: 18/285,428

(22) PCT Filed: Mar. 8, 2022

(86) PCT No.: PCT/JP2022/010056
§ 371 (c)(1),
(2) Date: Oct. 3, 2023

(87) PCT Pub. No.: WO2022/215417
PCT Pub. Date: Oct. 13, 2022

(65) Prior Publication Data
US 2024/0110834 A1 　　 Apr. 4, 2024

(30) Foreign Application Priority Data
Apr. 9, 2021 　 (JP) ................................. 2021-066292

(51) Int. Cl.
G01J 5/08 　　　　 (2022.01)
G01J 5/00 　　　　 (2022.01)
(52) U.S. Cl.
CPC ........... G01J 5/0846 (2013.01); *G01J 5/0007* (2013.01)

(58) Field of Classification Search
CPC ................... G01J 5/0846; G01J 5/0007; G01J 2005/0074; G01J 5/602; G01J 5/806; (Continued)

(56) References Cited

U.S. PATENT DOCUMENTS

| | | | |
|---|---|---|---|
| 4,956,538 A | 9/1990 | Moslehi | |
| 4,979,133 A | 12/1990 | Arima et al. | |
| 2007/0238202 A1 | 10/2007 | Ranish et al. | |

FOREIGN PATENT DOCUMENTS

| | | | | |
|---|---|---|---|---|
| CN | 106052880 A | * 10/2016 | ................ | G01J 5/00 |
| EP | 3264055 A1 | * 1/2018 | ............ | G01J 5/0813 |

(Continued)

OTHER PUBLICATIONS

European Patent Office, Extended European Search Report Issued in Application No. 22784402.4, Mar. 5, 2025, Germany, 9 pages.

(Continued)

*Primary Examiner* — Laura Martin
*Assistant Examiner* — Julia Fitzpatrick
(74) *Attorney, Agent, or Firm* — Alleman Hall LLP

(57) ABSTRACT

There is provided a radiation temperature measurement device that accurately measures a temperature of an object being measured, and that includes two infrared detection units that detect mutually different infrared wavelength bands, a spectral characteristics data storage unit that stores spectral characteristics data showing a transmittance and a reflectance of each of the objects being measured, and a temperature calculation unit that, based on infrared ray quantities detected by each of the two infrared detection units, and on the transmittance and reflectance of each of the objects being measured, calculates the temperature of each of the objects being measured.

6 Claims, 4 Drawing Sheets

(58) Field of Classification Search
CPC .. G01J 5/08; G01J 5/00; G01J 2005/00; G01J
5/80
See application file for complete search history.

(56) References Cited

FOREIGN PATENT DOCUMENTS

| JP | 2001056253 | A | | 2/2001 |
|----|------------|---|---|--------|
| JP | 2002122480 | A | | 4/2002 |
| JP | 2008020384 | A | * | 1/2008 |
| JP | 2008292324 | A | * | 12/2008 |
| JP | 2009500851 | A | | 1/2009 |
| JP | 5074972 | B2 | * | 11/2012 |
| JP | 2017090351 | A | | 5/2017 |
| JP | 2018132476 | A | * | 8/2018 |
| JP | 2020085696 | A | * | 6/2020 |
| JP | 2020085697 | A | * | 6/2020 |
| KR | 101197790 | B1 | * | 11/2012 |
| WO | 2007005489 | A2 | | 1/2007 |

OTHER PUBLICATIONS

ISA Japan Patent Office, International Search Report Issued in Application No. PCT/JP2022/010056, May 31, 2022, WIPO, 4 pages.

* cited by examiner

CROSS-SECTIONAL VIEW SCHEMATICALLY SHOWING
A SPECTRAL CHARACTERISTICS MEASUREMENT UNIT

PLACEMENT OF INFRARED LIGHT SOURCES
AND REFLECTANCE SENSORS

CROSS-SECTIONAL VIEW SCHEMATICALLY
SHOWING EACH SENSOR

DUAL METHOD: USES TWO INFRARED DETECTION UNITS
SINGLE METHOD: USES ONE INFRARED DETECTION UNIT

RADIATION TEMPERATURE MEASUREMENT DEVICE AND RADIATION TEMPERATURE MEASUREMENT METHOD

TECHNICAL FIELD

The present invention relates to a radiation temperature measurement device and radiation temperature measurement method.

TECHNICAL BACKGROUND

Conventionally, a non-contact type of radiation thermometer has been developed that detects infrared rays emitted from an area being measured using an infrared sensor (for example, a thermopile), and then measures the temperature of the area being measured using the detected infrared ray quantity.

In this radiation thermometer, not only the area being measured, but also a background of that area falls within the measurement field of view of the infrared sensor, so that it is difficult to accurately measure the temperature of the area being measured simply by detecting infrared rays reflected from the area being measured.

DOCUMENTS OF THE PRIOR ART

Patent Documents

Patent Document 1

Japanese Unexamined Patent Application (JP-A) No. 2017-90351

DISCLOSURE OF THE INVENTION

Problems to be Solved by the Invention

In consideration of the above-described problem, the inventors of the present application devised a radiation temperature measurement device having two infrared detection units which detect mutually different infrared wavelength bands, and that calculates a temperature of an area being measured based on the infrared ray quantities detected by these two infrared detection units.

More specifically, the temperature of an area being measured is calculated in the following manner.

A total quantity of infrared rays in a predetermined wavelength band that is irradiated onto the infrared detection units from the area being measured is the sum of infrared rays A1 from the area being measured, infrared rays A2 from the background of the area being measured, and infrared rays A3 reflected by the area being measured. In a case in which the infrared detection units and the area being measured are directly facing each other, A3 is formed by the infrared rays from infrared detection units and is consequently a known value. Accordingly, a ratio R between A1 and A2 is found by R=A1/A2. In other words, R is the emissivity/transmittance of the area being measured.

Because the detected infrared wavelength band differs between the two infrared detection units, the ratio R between A1 and A2 is separated into R1 and R2 in the respective infrared detectors. Accordingly, the temperature of the area being measured is calculated using simultaneous equations or a bisection method from the infrared ray quantity detected by one of the infrared detection units and the infrared ray quantity detected by the other of the infrared detection units, and from the known ratios R1 and R2 in the respective wavelength bands. Note that it is necessary that the ratios R1 and R2 in the respective wavelength bands be determined in advance. Moreover, in a case in which R1=R2, it is not possible for simultaneous equations to be calculated, and neither is it possible for the temperature of the area being measured to be calculated.

Here, in a case in which the temperature of a silicon substrate, for example, is being measured, then it is known that a silicon substrate has a high transmittance, and that, when the temperature of a silicon substrate is 600° C. or less, the transmittance thereof changes in accordance with the temperature. In particular, when measuring the temperature of a silicon substrate which is at 200° C. or less, the measurement is affected by infrared rays from the background due to the transmittance thereof, so that measuring the temperature is not considered possible in this case as well.

In particular, in a semiconductor manufacturing device, the temperatures of a variety of different types of subjects (such as substrates having varying quantities of dopants, substrates having oxide films, nitride films, or metal films formed on the surface thereof, and substrates having resist films formed thereon) are measured, and it difficult for R1 and R2 to be determined. Moreover, even if R1 and R2 are known values for silicon substrates that have undergone the same processing (for example, silicon substrates on which a 200 nm $SiO_2$ (silicon oxide) film has been formed), in a case in which these substrates are processed in a semiconductor manufacturing device, R1 and R2 become changed due to differences between the film thicknesses of the substrates, so that it is not possible to perform an accurate temperature measurement.

The present invention was conceived in order to solve the above-described problems, and it is a principal object thereof to enable the temperature of an object being measured to be measured accurately.

Means for Solving the Problem

In other words, a radiation temperature measurement device according to the present invention is a radiation temperature measurement device that measures a temperature of an object being measured, and is characterized in being provided with two infrared detection units that detect mutually different infrared wavelength bands, a spectral characteristics data storage unit that stores spectral characteristics data showing a transmittance and a reflectance of each of the objects being measured, and a temperature calculation unit that, based on infrared ray quantities detected by each of the two infrared detection units and on the transmittance and reflectance of each of the objects being measured, calculates the temperature of each of the objects being measured.

According to this radiation temperature measurement device, in a structure that detects infrared ray quantities using two infrared detection units that detect mutually different infrared wavelength bands, because the temperatures of each object being measured are calculated using spectral characteristics data showing a transmittance and a reflectance of each of the objects being measured, it is possible to accurately measure the temperature of each object being measured.

As a specific aspect that is employed in order to acquire spectral characteristics data for each object being measured, it is desirable that the radiation temperature measurement device of the present invention be further provided with a spectral characteristics measurement unit that measures the transmittance and reflectance of each of the objects being measured, and that the spectral characteristics data storage unit store the spectral characteristics data obtained by the spectral characteristics measurement unit.

In order to enable the temperature of an object being measured to be measured even more accurately, it is desirable that the spectral characteristics measurement unit measure the transmittance and reflectance of each of the objects being measured using either all of, or a portion of, the infrared wavelength bands detected by the two infrared detection units.

In a case in which the transmittance of each of the objects being measured is equal to or greater than a predetermined value, it is desirable that the temperature of the objects being measured be calculated using the infrared ray quantities detected by the two infrared detection units and, in a case in which the transmittance of each of the objects being measured is less than the predetermined value, that the temperature of the objects being measured be calculated using an infrared ray quantity measured by one of the two infrared detection units.

It is also possible for the radiation temperature measurement device of the present invention to measure a temperature of an object being measured that is contained in a chamber. In the case of a structure such as this, errors in the radiation temperature occur due to effects caused by the chamber itself.

In order to solve problems of this type, it is desirable that the temperature calculation unit correct the temperature of each object being measured using temperature correction parameters originating in the chamber.

Moreover, a radiation temperature measurement method according to the present invention is a radiation temperature measurement method for measuring a temperature of an object being measured in which a transmittance and a reflectance of each of the objects being measured are measured, infrared ray quantities are detected using two infrared detection units that detect mutually different infrared wavelength bands, and the temperature of each of the objects being measured is calculated based on infrared ray quantities detected by each of the two infrared detection units and on the transmittance and reflectance of each of the objects being measured.

Effects of the Invention

According to the above-described present invention, it is possible to accurately measure the temperature of an object being measured.

BEST EMBODIMENTS FOR IMPLEMENTING THE INVENTION

Hereinafter, a semiconductor manufacturing system that incorporates a radiation temperature measurement device according to an embodiment of the present invention will be described with reference to the drawings.

A semiconductor manufacturing system 100 of the present embodiment is provided with a semiconductor manufacturing device 2 that includes processing chambers 22 in which semiconductor wafers W such as, for example, silicon substrates and the like are processed, and a radiation temperature measurement device 3 that measures a temperature of the semiconductor wafers W serving as objects being measured that are placed inside the processing chambers 22.

Figure 1:
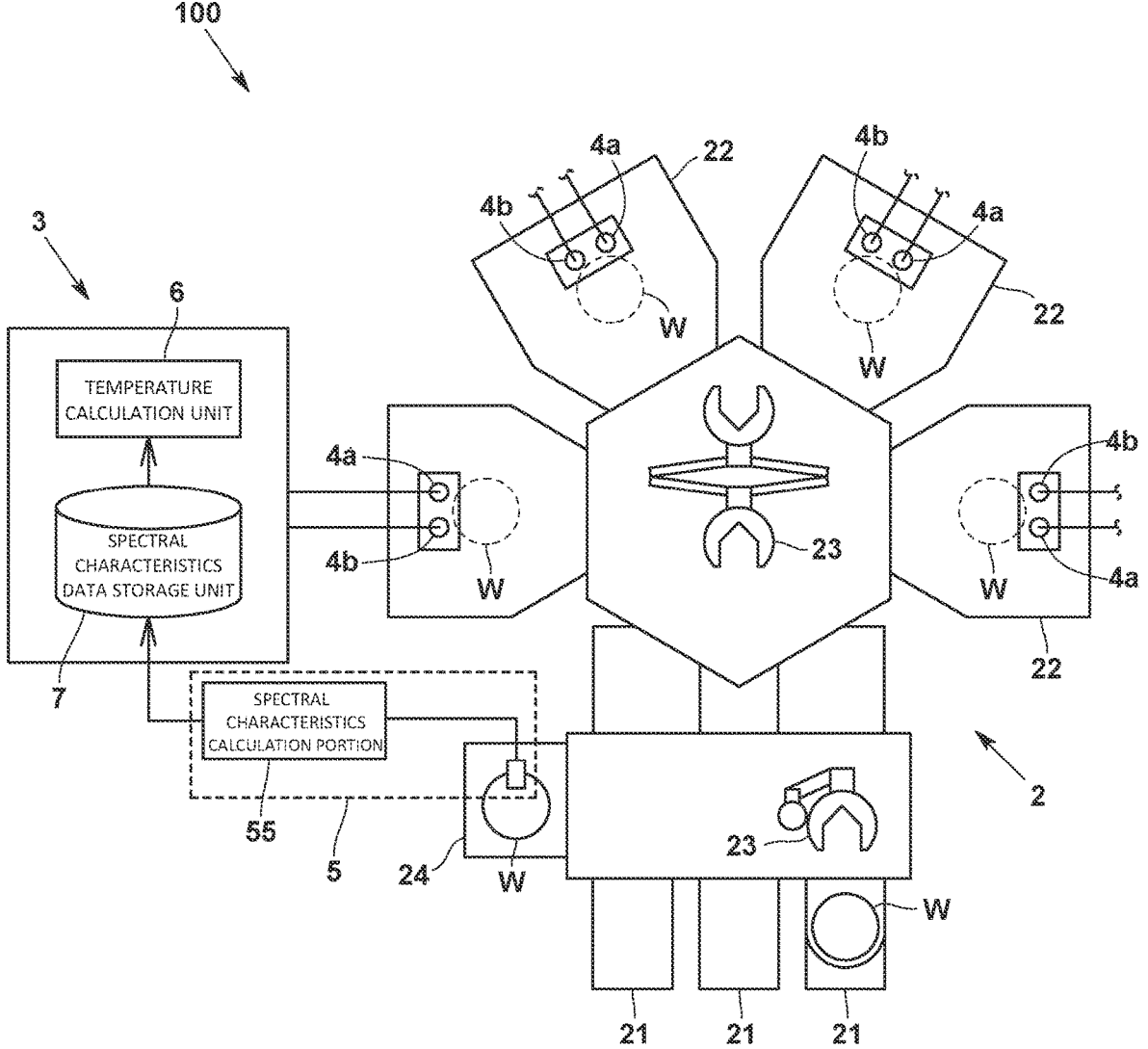
FIG. 1 is an overall schematic view showing a semiconductor manufacturing system according to an embodiment of the present invention.

As is shown in FIG. 1, the semiconductor manufacturing device 2 includes wafer cassettes 21 in which the semiconductor wafers W are stored both before and after processing, either one or a plurality of processing chambers 22, and a wafer transporting device 23 that transports the semiconductor wafers W between the wafer cassettes 21 and the processing chambers 22. In the single or multiple processing chambers 22 of the present embodiment, processings such as, for example, deposition, etching, washing, surface modification, and heating or cooling and the like are performed.

Figure 2:
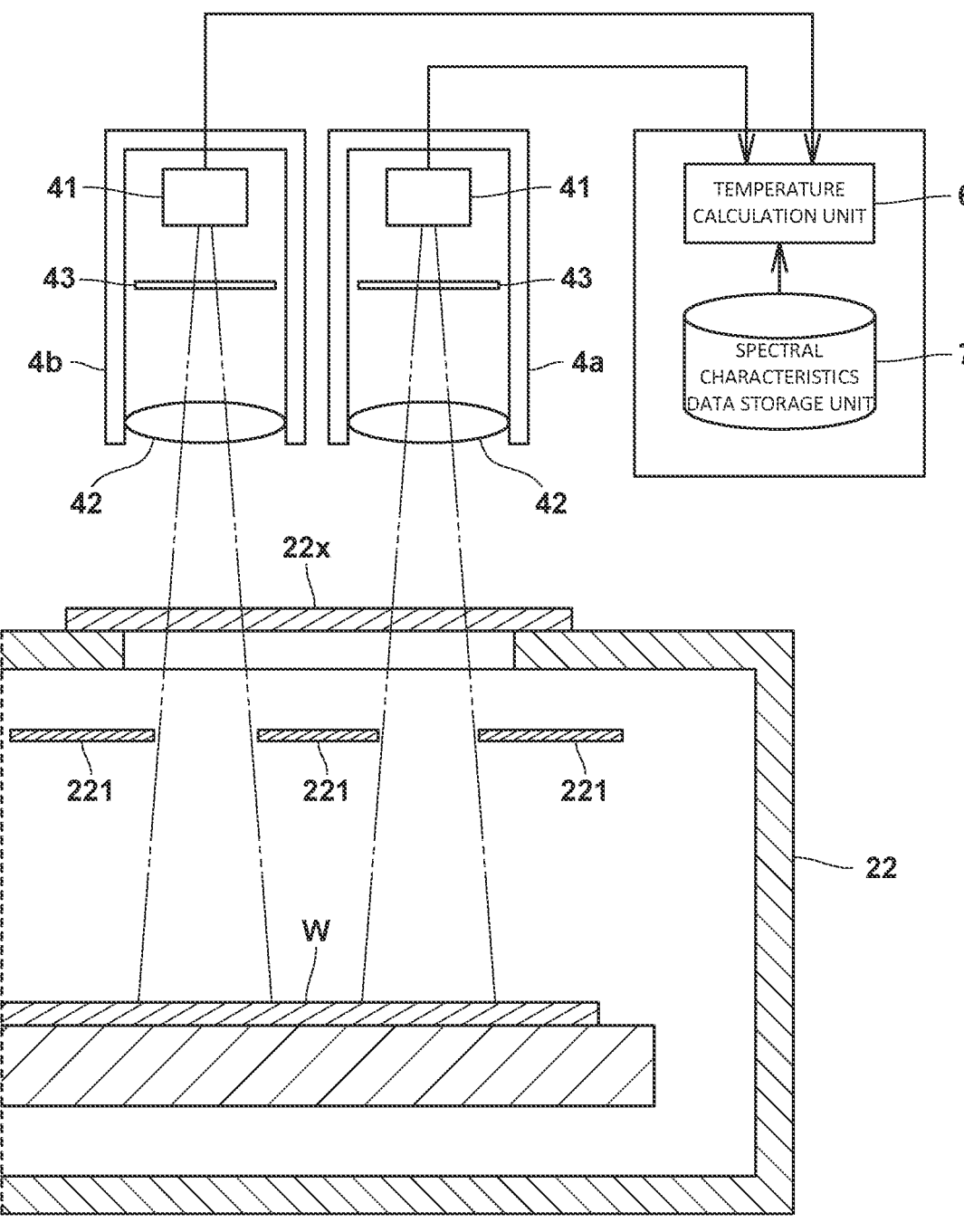
FIG. 2 is a view schematically showing a structure of a radiation temperature measurement device of the same embodiment.

As is shown in FIG. 1 and FIG. 2, the radiation temperature measurement device 3 is provided with two infrared detection units 4a and 4b that detect mutually different infrared wavelength bands, a spectral characteristics measurement unit 5 that measures a transmittance and a reflectance of each of the semiconductor wafers W, and a temperature calculation unit 6 that, based on infrared ray quantities detected by each of the two infrared detection units 4a and 4b and on the transmittance and reflectance of each of the semiconductor wafers W measured by the spectral characteristics measurement unit 5, calculates the temperature of each of the semiconductor wafers W.

The two infrared detection units 4a and 4b are provided respectively in each of the processing chambers 22. More specifically, as is shown in FIG. 2, the infrared detection units 4a and 4b detect infrared rays from a semiconductor wafer W placed in the processing chamber 22 via a temperature measurement window 22x that is formed in a wall of the processing chamber 22 and through which infrared rays are transmitted. In addition, each of the infrared detection units 4a and 4b is equipped with an infrared detection element 41 that detects infrared rays, a lens 42 that condenses infrared rays on the infrared detection element 41, and an infrared filter 43 that is provided between the infrared detection element 41 and the lens 42 and that transmits infrared rays of a predetermined detection wavelength band.

The infrared detection element 41 detects infrared rays emitted from an object being measured and outputs an intensity signal that corresponds to the energy of the detected infrared rays. More specifically, the infrared detection element 41 detects infrared rays from, for example, all wavelength bands in the infrared wavelength bands and, in this case, is formed by a thermal detection element such as a thermopile or the like. Note that it is also possible for other types of detection elements such as, for example, quantum photoelectric elements such as HgCdTe, InGaAs, InAsSb, and PbSe elements to be used as the infrared detection element 41.

The lens 42 is an IR lens that condenses infrared rays emitted from a semiconductor wafer W onto the infrared detection element 41. When looked at in plan view, the lens 42 is formed in a substantially circular shape having a diameter of approximately 10 mm to 22 mm. Note that the shape and size of the lens 42 are not limited to those described above and may be altered as is appropriate.

The infrared filter 43 provided in each infrared detection unit 4a transmits infrared rays of, for example, not less than 7 μm and not more than 9 μm, while the infrared filter 43 provided in each infrared detection unit 4b transmits infrared rays of, for example, not less than 8 μm and not more than 14 μm.

As is shown in FIG. 1, the spectral characteristics measurement portion 5 is provided, for example, in a chamber 24 that is different from the processing chambers 22, and measures the transmittance and reflectance of each semiconductor wafer W before that semiconductor wafer W is transported to a processing chamber 22.

Figure 3A:
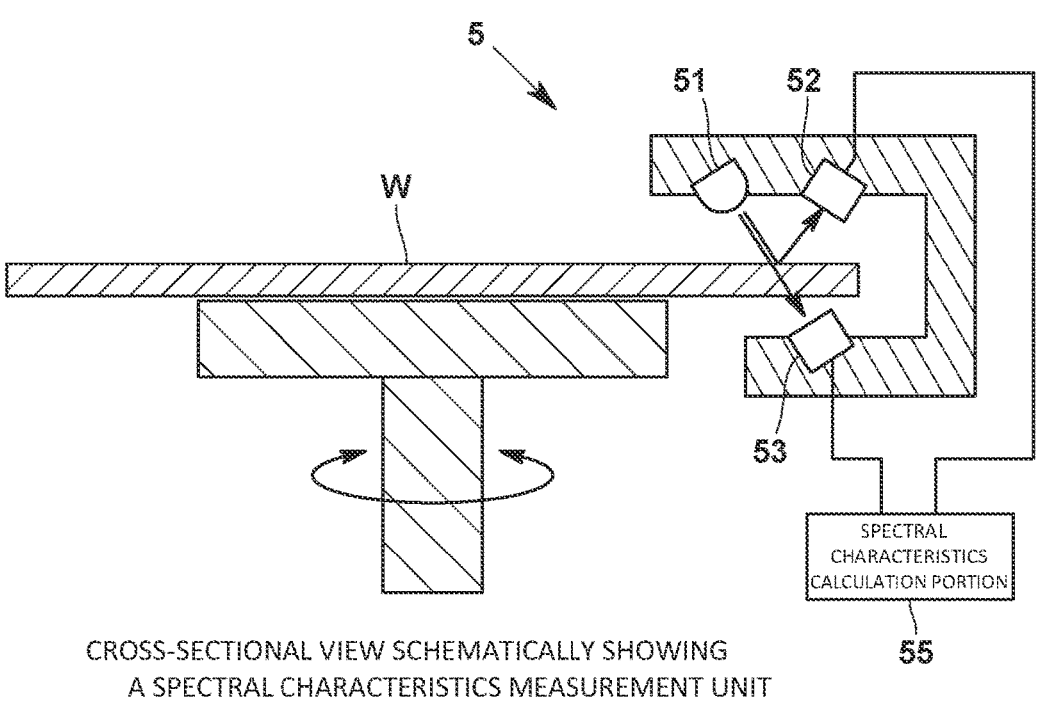
FIGS. 3A to 3C are views schematically showing a structure of a spectral characteristics measurement unit of the same embodiment.
Figure 3B:
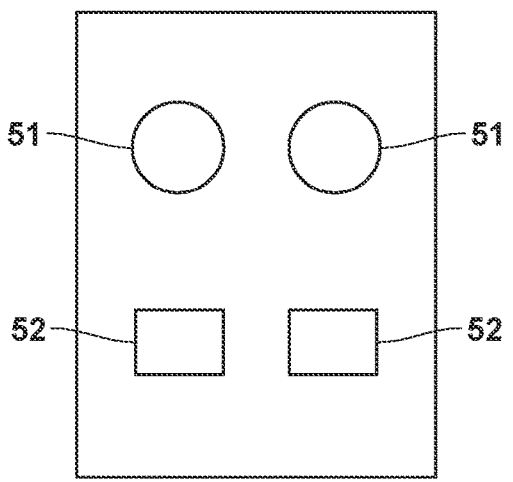
Figure 3B:
Figure 3C:
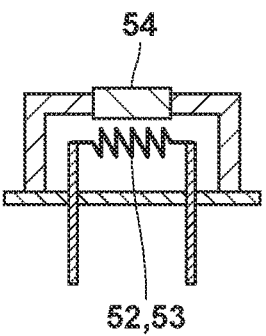

More specifically, as is shown in FIGS. 3A to 3C, the spectral characteristics measurement unit 5 includes an infrared light source 51 that irradiates infrared rays of a predetermined wavelength band onto the semiconductor wafers W, a reflectance sensor 52 that detects infrared rays reflected by the semiconductor wafers W, and a transmittance sensor 53 that detects infrared rays transmitted through the semiconductor wafers W.

Two infrared light sources 51 are provided so as to correspond to the two infrared detection units 4a and 4b. In the present embodiment, each infrared light source 51 irradiates infrared rays of a wavelength band that includes both detection wavelength bands of the two infrared detection units 4a and 4b. Note that it is also possible for one of the infrared light sources 51 to irradiate infrared rays of either all of or a portion of the detection wavelength band of the one infrared detection units 4a, and for the other of the infrared light sources 51 to irradiate infrared rays of either all of or a portion of the detection wavelength band of the other infrared detection units 4b.

One reflectance sensor 52 and one transmittance sensor 53 are provided respectively for each of the two infrared detection units 4a and 4b. One reflectance sensor 52 and transmittance sensor 53 detect infrared rays from the one infrared light source 4a, while the other reflectance sensor 52 and transmittance sensor 53 detect infrared rays from the other infrared light source 4b. Here, a filter 54 that transmits infrared light in the detection wavelength band of the corresponding infrared detection unit 4a or 4b is provided in front of each reflectance sensor 52 and transmittance sensor 53.

In addition, a spectral characteristics calculation portion 55 of the spectral characteristics measurement unit 5 calculates a reflectance of each semiconductor wafer W based on a detection signal from the reflectance sensor 52, and calculates a transmittance of each semiconductor wafer W based on a detection signal from the transmittance sensor 53.

Spectral characteristics data showing the reflectance and transmittance of each semiconductor wafer W that have been calculated by the spectral characteristics calculation portion 55 is stored in a spectral characteristics data storage unit 7.

The temperature calculation unit 6 calculates the temperature of each semiconductor wafer W based on the infrared ray quantities detected respectively by the two infrared detection units 4a and b, and on the transmittance and reflectance of each semiconductor wafer W measured by the spectral characteristics measurement unit 5.

More specifically, the temperature of each semiconductor wafer W is calculated using the following calculation method.

Firstly, an infrared ray quantity $E_1$ (Tx) from a semiconductor wafer W and an infrared ray quantity $E_1$ (Tb) from a background are obtained by the infrared detection unit 4a of a detection wavelength band 1 (i.e., infrared rays of not less than 7 μm and not more than 9 μm).

Next, an infrared ray quantity $E_2$ (Tx) from a semiconductor wafer W and an infrared ray quantity $E_2$ (Tb) from a background are obtained by the infrared detection unit 4b of a detection wavelength band 2 (i.e., infrared rays of not less than 8 μm and not more than 14 μm).

Ratios $R_1$ and $R_2$ are then taken between the infrared ray quantity from the semiconductor wafer W and the infrared ray quantity of the background, and an infrared ray quantity $W_1$ that is irradiated onto the infrared detection unit 4a of the detection wavelength band 1 is calculated using the following Equation (1).

$$W_1 = R_1 \cdot E_1(Tx) + (1 - R_1) \cdot E_1(Tb) \tag{1}$$

An infrared ray quantity $W_2$ that is irradiated onto the infrared detection unit 4b of the detection wavelength band 2 is also calculated using the following Equation (2).

$$W_2 = R_2 \cdot E_2(Tx) + (1 - R_2) \cdot E_2(Tb) \tag{2}$$

The detection wavelength bands 1 and 2 are determined in such a way that $R_1 \neq R_2$, and because there are two unknown quantities Tx and Tb, using Equations (1) and (2), it can be found that:

$$E_1^{-1}((W_1 - R_1 \cdot E_1(Tx))/(1 - R_1)) = E_2^{-1}((W_2 - R_2 \cdot E_2(Tx))/(1 - R_2)) \tag{3}$$

Because a relationship E (T) between the spectral radiation energy and the temperature increases monotonically, it is possible to determine the temperature Tx of the semiconductor wafer W due to the fact that there is one solution that satisfies Equation (3). Note that it is possible to establish a model equation while considering infrared rays $A_3$ that are reflected by the semiconductor wafer W and taking into account other shielding objects (for example, light-shielding plates 221 shown in FIG. 2).

In other words, in the present embodiment, the temperature calculation unit 6 is able to correct the temperature of each semiconductor wafer W using temperature correction parameters originating in the chamber 22 in which each semiconductor wafer W is housed.

Here, $R_1$ and $R_2$ in the above-described Equation (3) are determined using the reflectance and transmittance of each semiconductor wafer W measured by the spectral characteristics measurement unit 5, and the temperature calculation unit 6 calculates the temperature of each semiconductor wafer W based on the above-described Equation (3).

Next, a radiation temperature measurement method for measuring each of a plurality of semiconductor wafers W will be described.

Firstly, a semiconductor wafer W that is to be measured is transported from a wafer cassette 21 to the spectral characteristics measurement chamber 24 by the wafer transporting device 23. The spectral characteristics measurement unit 5 that is provided in the spectral characteristics measurement chamber 24 measures the reflectance and transmittance of the semiconductor wafer W. Spectral characteristics data showing the measured reflectance and transmittance is stored in the spectral characteristics data storage unit 7. In this way, in the present embodiment, the spectral characteristics of each semiconductor wafer W are measured one-by-one before each wafer is transported to a processing chamber 22.

Moreover, parameters relating to elements affecting the detection results from the two infrared detection units 4*a* and 4*b* (for example, the type of temperature measurement window 22*x*, obstructions located between the infrared detection units 4*a* and 4*b* and the semiconductor wafer W, and the temperature of the internal walls of the chamber 22, and the like) are matched with the spectral characteristics data.

Next, the wafer transporting device 23 transports a semiconductor wafer whose spectral characteristics have been measured to the processing chamber 22. Here, the two infrared detection units 4*a* and 4*b* detect infrared rays from the semiconductor wafer W through the temperature measurement window 22*x* formed in the processing chamber 22. Next, the temperature calculation unit 6 calculates the temperature of the semiconductor wafer W based on the infrared ray quantities obtained by the two infrared detection units 4*a* and 4*b* and on the transmittance and reflectance of the semiconductor wafer W that have been measured in advance. Processing is performed on the semiconductor wafer W at the same time as the temperature of the semiconductor wafer W is being measured by the radiation temperature measurement device 3 in this way.

Effects Obtained from the Present Embodiment

According to the radiation temperature measurement device 3 that is formed in the manner described above, in a structure in which infrared ray quantities are detected by two infrared detection units 4*a* and 4*b* that each detect mutually different infrared wavelength bands, because the respective temperatures of semiconductor wafers W are calculated using spectral characteristics data that shows the transmittances and reflectances of each of the semiconductor wafers W, it is possible to accurately measure the temperature of a semiconductor wafer W.

ADDITIONAL EMBODIMENTS

Note that the present invention is not limited to the above-described embodiment.

Figure 4:
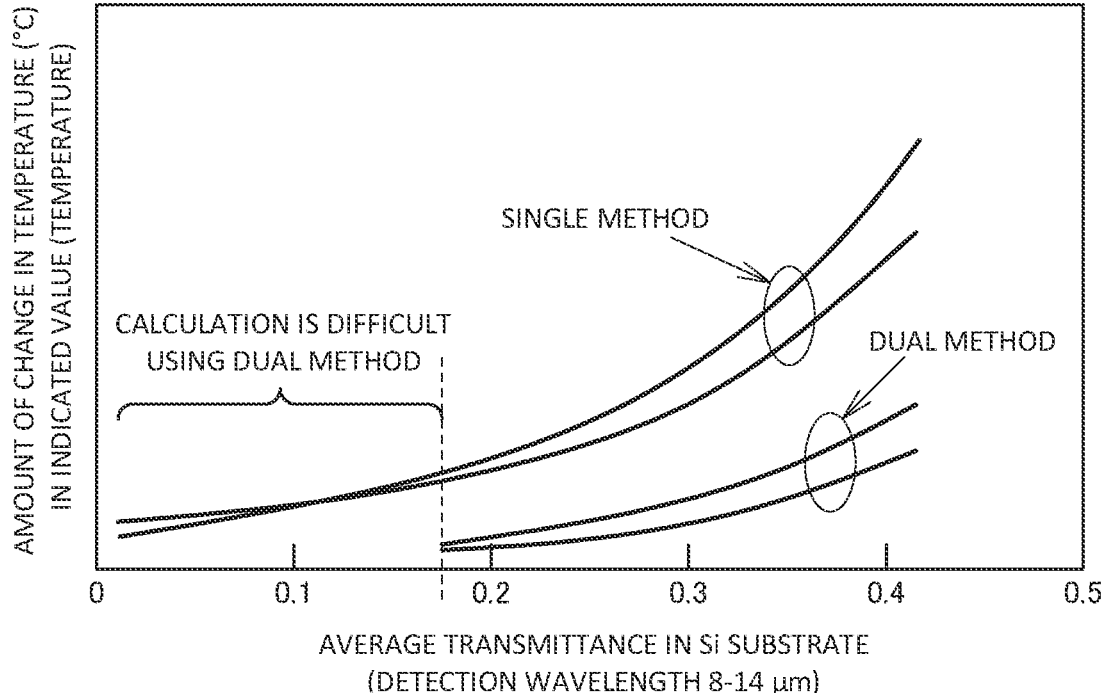
FIG. 4 is a graph showing a transmittance together with an accompanying amount of change in temperature in both a dual method and a single method of the same embodiment.

As is shown in FIG. 4, in a case in which the transmittance of a semiconductor wafer W is less than a predetermined value, because R1≈R2, it is difficult to calculate the temperature of a semiconductor wafer W using infrared ray quantities detected by the two infrared detection units 4*a* and 4*b* (i.e., using a dual method). Because of this, in addition to the structure of the above-described embodiment, it is also possible to employ a structure in which, in a case in which the transmittance of the semiconductor wafer W is equal to or greater than a predetermined value, the temperature of the semiconductor wafer W is calculated using the infrared ray quantities detected by the two infrared detection units 4*a* and 4*b*, and in a case in which the transmittance of the semiconductor wafer W is less than the predetermined value, the temperature of the semiconductor wafer W is calculated using an infrared ray quantity measured by only one of the two infrared detection units 4*a* or 4*b* (i.e., a single method). Here, the transmittance of the semiconductor wafer W is the transmittance obtained by the spectral characteristics measurement unit 5.

Furthermore, it is also possible to provide a temperature adjustment mechanism that adjusts the temperature of the semiconductor wafer W when the reflectance and transmittance of the object being measured are being measured by the spectral characteristics measurement unit 5. By employing this type of structure, it is possible to measure the reflectance and transmittance of a semiconductor wafer W that has been adjusted to a desired temperature. For example, it is possible to measure the reflectance and transmittance of a semiconductor wafer W that has been adjusted to the temperature to which it will be heated in the processing chamber 22, so that it is possible to measure the temperature of a semiconductor wafer placed in the processing chamber 22 even more accurately.

In the above-described embodiment, a structure is employed in which the spectral characteristics of a semiconductor wafer W are measured each time prior to that semiconductor wafer W being transported to the processing chamber 22, however, it is also possible to measure the respective spectral characteristics of a plurality of semiconductor wafers W in advance, and to store the resulting spectral characteristics data in the spectral characteristics data storage unit 7.

In the above-described embodiment, a structure is employed in which temperature correction parameters are matched to measured spectral characteristics data, and the temperature calculation unit 6 corrects the temperature of a semiconductor wafer W using by using the spectral characteristics data to which the temperature correction parameters have been matched, however, it is also possible for the temperature calculation unit 6 to calculate the temperature of a semiconductor wafer W using measured spectral characteristics data, and to then correct the calculated temperature using temperature correction parameters. Note that it is also possible to employ a structure in which the temperature calculation unit 6 corrects a temperature using correction parameters.

The object being measured W of the above-described embodiment is not limited to being a semiconductor wafer such as a silicon substrate and other materials may be used provided that the material is one in which R1≠R2.

The radiation temperature measurement device 3 of the above-described embodiment is incorporated into the semiconductor manufacturing device 2, however, it is also possible to employ a single unit structure in which the radiation temperature measurement device 3 is not incorporated into the semiconductor manufacturing device 2.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

According to the present invention, there is provided a radiation temperature measurement device that accurately measures the temperature of an object being measured.

DESCRIPTION OF THE REFERENCE CHARACTERS

100 . . . Semiconductor Manufacturing System
W . . . Semiconductor Wafer (Object Being Measured)

2 . . . Semiconductor Manufacturing Device
22 . . . Processing Chamber
24 . . . Spectral Characteristics Chamber
3 . . . Radiation Temperature Measurement Device
4a, 4b . . . Infrared Detection Units
5 . . . Spectral Characteristics Measurement Unit
6 . . . Temperature Calculation Unit
7 . . . Spectral Characteristics Data Storage Unit

What is claimed is:

1. A radiation temperature measurement device that measures a temperature of an object being measured, comprising:

two infrared detection units that are provided at a processing chamber configured for processing the object being measured, and that detect infrared ray quantities in mutually different infrared wavelength bands;

a spectral characteristics measurement unit that is provided at a spectral characteristics measurement chamber that is different from the processing chamber, and that measures a transmittance and a reflectance of the object being measured;

a spectral characteristics data storage unit that stores spectral characteristics data that indicates the transmittance and the reflectance obtained by the spectral characteristics measurement unit; and a temperature calculation unit that, based on the infrared ray quantities detected by each of the two infrared detection units and on the transmittance and the reflectance of the object being measured, calculates the temperature of the object being measured.

2. The radiation temperature measurement device according to claim 1, wherein the spectral characteristics measurement unit measures the transmittance and the reflectance of the object being measured using either all of or a portion of the infrared wavelength bands detected by the two infrared detection units.

3. The radiation temperature measurement device according to claim 1, wherein, in a case in which the transmittance of the object being measured is equal to or greater than a predetermined value, the temperature of the object being measured is calculated using the infrared ray quantities detected by the two infrared detection units, and, in a case in which the transmittance of the object being measured is less than the predetermined value, the temperature of the object being measured is calculated using an infrared ray quantity measured by one of the two infrared detection units.

4. The radiation temperature measurement device according to claim 1, wherein the temperature calculation unit corrects the temperature of the object being measured using a temperature correction parameter originating in the processing chamber.

5. A radiation temperature measurement method for measuring a temperature of an object being measured, comprising:

detecting, by two infrared detection units that are provided at a processing chamber configured for processing the object being measured, infrared ray quantities in mutually different infrared wavelength bands;

measuring, by a spectral characteristics measurement unit that is provided at a spectral characteristics measurement chamber that is different from the processing chamber, a transmittance and a reflectance of the object being measured; and calculating, by a temperature calculation unit, the temperature of the object being measured based on the infrared ray quantities detected by each of the two infrared detection units and on the transmittance and the reflectance of the object being measured.

6. The radiation temperature measurement device according to claim 1, wherein the spectral characteristics measurement unit measures the transmittance and the reflectance of the object being measured before the object being measured is transported into the processing chamber.

* * * * *